No. 701,465. Patented June 3, 1902.
W. B. CAVIN.
MIXING MACHINE FOR CONCRETE, &c.
(Application filed Mar. 8, 1902.)
(No Model.)
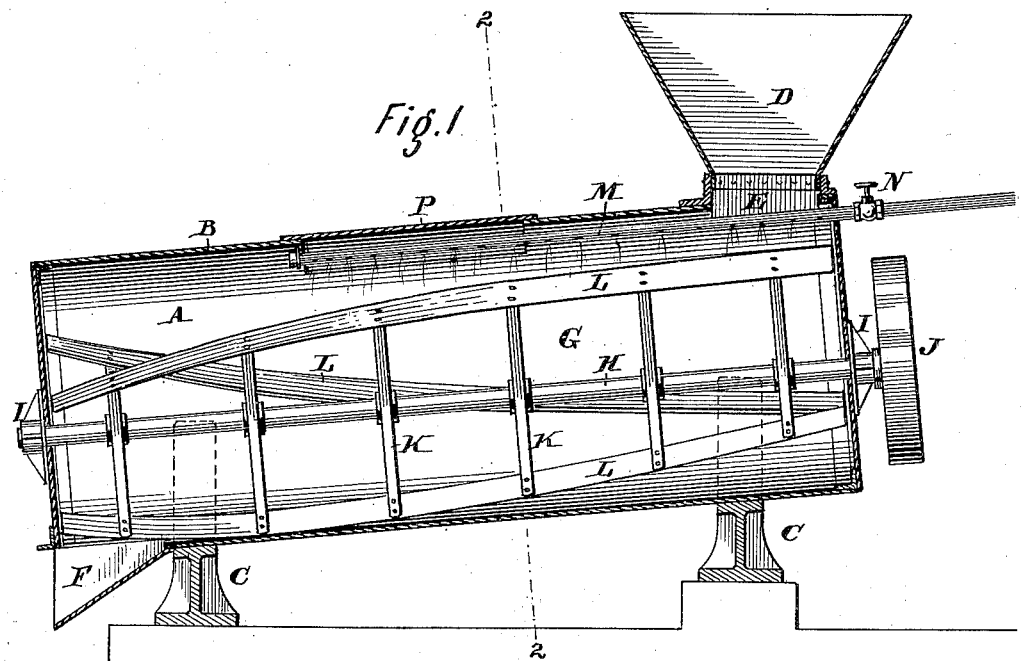
Fig. 1
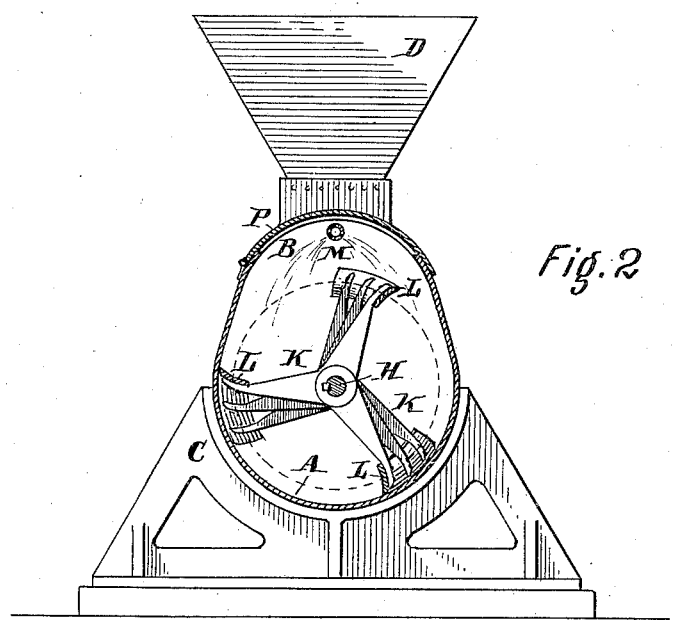
Fig. 2
Fig. 3
Attest
R. M. Kelly
J. Mac Master
Inventor
Wm. B. Cavin
By his atty
THE NORRIS PETERS CO., PHOTO-LITHO., WASHINGTON, D. C.

UNITED STATES PATENT OFFICE.

WILLIAM B. CAVIN, OF PHILADELPHIA, PENNSYLVANIA.

MIXING-MACHINE FOR CONCRETE, &c.

SPECIFICATION forming part of Letters Patent No. 701,465, dated June 3, 1902.

Application filed March 8, 1902. Serial No. 97,215. (No model.)

*To all whom it may concern:*

Be it known that I, WILLIAM B. CAVIN, of the city and county of Philadelphia, State of Pennsylvania, have invented an Improvement in Mixing-Machines for Concrete, &c., of which the following is a specification.

My invention has reference to mixing-machines for concrete, &c.; and it consists of certain improvements fully set forth in the following specification and shown in the accompanying drawings, which form a part thereof.

The object of my invention is to provide a simple form of machine adapted to mix cement, sand, or broken stone and water, whereby a most thorough and homogeneous mixture of the ingredients is insured.

In carrying out my invention I provide a cylindrical casing having a hopper at one end and discharge-opening at the other, preferably of greater height than width and, if desired, set obliquely and combined with a water-pipe at the hopper end, and a rotating mixer-shaft having spiral mixing-blades, preferably of increasing obliquity as they near the discharge end of the casing.

My invention also embodies details of construction which, together with the above features, will be better understood by reference to the drawings, in which—

Figure 1 is a longitudinal sectional elevation of a mixing-machine embodying my improvements. Fig. 2 is a cross-section of same on line 2 2, and Fig. 3 is a diagram showing the curvature of the mixing-blades.

A is the casing and is made substantially egg-shaped in cross-section, whereby the lower portion is cylindrical, so as to be properly swept by the mixer-blades, and the upper portion B is raised clear of the said blades, as is clearly shown in Fig. 2. In this manner the casing is of greater height than width. This casing is closed at both ends and is provided with a hopper D and throat E at its top at one end and a discharge-chute F at the bottom of the other end, said parts being preferably upon the body of the casing and not in its ends. A door P in the top of the casing may be used to normally close a large opening through which access to the interior may be had when necessary, either when making repairs or during the operation of the machine to see the action on the materials and determine the proper admixture and also to clear any obstruction which may occur at any time. This casing is preferably set on a slight incline and supported upon standards C.

G is a mixer, and consists of a shaft H, extending through the casing and journaled at each end in bearings I, and carrying the arms K, provided with the mixing-blades L. These blades L are preferably three in number and have a spiral shape whereby they are somewhat oblique to the length of the casing. In practice I prefer that this obliquity shall increase at the discharge end for the reason that it insures a quicker feeding of the mixed materials as soon as in condition for discharge and prevents any clogging due to setting or packing of the materials when in condition for setting. The increasing obliquity of the blades L is indicated in the diagram, Fig. 3, in which $x$ $x$ represent a line parallel with the axis of the mixer and the blade L leaves this line from point L', uniform at first, but with greater obliquity between the points L to $L^2$, the latter representing the discharge end. The blades are made to sweep the surface of the lower portion of the cylindrical casing, but when elevated they are clear of all surfaces and the materials are caused to drop from them and thereby be more thoroughly incorporated or mixed. The blades L, as shown, sweep the space below the hopper D and also sweep the discharge-aperture F for positively clearing it and causing definite discharge of the mixed concrete or other materials. The mixer-shaft H is slowly rotated by any suitable means, that shown being a band-wheel J.

M is a water-spraying pipe and extends along the upper portion of the casing and across the throat E of the hopper D. This pipe is perforated and adapted to spray water in proper quantity upon the materials being mixed. The water is regulated by a valve N in the supply-pipe. The pipe M at the throat E mechanically acts also to more thoroughly mix the ingredients as they pass through the throat into the casing. The water admitted here may be only sufficient to wet out the ingredients and not sufficient to interfere with a more perfect mixing under the influence of the blades. As soon as they are mixed by the blades they receive more water from the pipe M beyond the throat until the proper and full quantity of water has been added to make a perfect concrete mixture. At this time the mixing becomes more difficult, and hence the quicker feeding of the concrete to the discharge end is accomplished to keep it feeding freely through the machine and avoid condensation or packing. I prefer that most of the water required shall be supplied by the spraying-pipe M after the materials have passed into the custody of the beaters; but I do not limit myself thereto, for, if desired, all of the water necessary may be supplied immediately at the feeding end of the machine.

The machine is set on an incline, and though this is not essential, it has the advantage of aiding the concrete mixture to be more easily fed to the discharge end, and thereby increases the capacity of the machine.

It is evident that more than one pipe M may be employed, if desired, and that more or less blades may be used, if found advantageous. It is also evident that while I prefer to make the cross-section of my casing egg-shaped, it is immaterial what shape is given to the top, the essential requirement of which is only that it shall afford a space in which the blades may clear the casing. In some cases this enlarged upper portion B may be omitted altogether. Therefore while I prefer the construction shown, I do not limit myself to the details thereof, as they may be modified in various ways without departing from the spirit of my invention.

Having now described my invention, what I claim as new, and desire to secure by Letters Patent, is—

1. In a mixing-machine, the combination of a cylindrical casing of greater height than width having a hopper at its top and opening into it at one end and having a discharge-opening at its bottom at the other end, a rotating shaft extending longitudinally through the casing and carrying spirally-arranged mixing-blades to sweep the interior and lower portion of the casing but clear the surface of the upper portion, and a water-spraying pipe arranged in the upper part of the casing at the hopper end for spraying water on the material being mixed.

2. In a mixing-machine, the combination of a cylindrical casing having a hopper at its top and opening into it at one end and having a discharge-opening at its bottom at the other end, a rotating shaft extending longitudinally through the casing and carrying spirally-arranged mixing-blades to sweep the interior and lower portion of the casing, and a water-spraying pipe arranged in the upper part of the casing and across the throat or opening of the hopper into the casing for spraying water upon the material being delivered to the casing and mixing-blades to be mixed.

3. In a mixing-machine, the combination of a cylindrical casing having a hopper at its top and opening into it at one end and having a discharge-opening at its bottom at the other end, a rotating shaft extending longitudinally through the casing and carrying spirally-arranged mixing-blades to sweep the interior and lower portion of the casing, and a water-spraying pipe arranged in the upper part of the casing across the throat of the hopper and over the casing beyond the throat for spraying water upon the material as they enter the casing and also as they are being mixed.

4. In a mixing-machine, the combination of a cylindrical casing of greater height than width having a hopper at its top and opening into it at the highest end and having a discharge-opening at its bottom at the other end and arranged on an incline, a rotating shaft extending longitudinally through the casing and carrying spirally-arranged mixing-blades to sweep the interior and lower portion of the casing and a water-spraying pipe arranged in the upper part of the casing across the throat of the hopper for spraying water upon the material being mixed.

5. In a mixing-machine, the combination of a cylindrical casing having a hopper at its top and opening into it at one end and having a discharge-opening at its bottom at the other end, a rotating shaft extending longitudinally through the casing and carrying spirally-arranged mixing-blades to sweep the interior and lower portion of the casing and in which the obliquity of the blades is greater at the discharging end than at the hopper end, and a water-spraying pipe arranged in the upper part of the casing for spraying water upon the material being mixed.

6. In a mixing-machine, the combination of a cylindrical casing having a hopper at its top and opening into it at one end and having a discharge-opening at its bottom at the other end, a rotating shaft extending longitudinally through the casing and carrying spirally-arranged mixing-blades to sweep the interior and lower portion of the casing and in which the obliquity of the blades is greater at the discharging end than at the hopper end.

7. In a mixing-machine, the combination of a cylindrical casing of greater height than width having a hopper at its top and opening into it at one end and having a discharge-opening at its bottom at the other end, a rotating shaft extending longitudinally through the casing and carrying spirally-arranged mixing-blades to sweep the interior and lower portion of the casing and in which the obliquity of the blades is greater at the discharging end than at the hopper end.

8. In a mixing-machine, the combination of a cylindrical casing of greater height than width having a hopper at its top and opening into it at one end and having a discharge-opening at its bottom at the other end, a rotating shaft extending longitudinally through the casing and carrying spirally-arranged mixing-blades to sweep the interior and lower portion of the casing and in which the obliquity of the blades is greater at the discharging end than at the hopper end, and a water-spraying pipe arranged in the upper part of the casing for spraying water upon the material being mixed.

9. In a mixing-machine, the combination of a cylindrical casing of greater height than width having a hopper at its top and opening into it at one end and having a discharge-opening at its bottom at the other end and an opening at its top intermediate of the hopper and discharge end, a door or cover for said opening, a rotating shaft extending longitudinally through the casing and carrying spirally-arranged mixing-blades to sweep the interior and lower portion of the casing and a water-spraying pipe arranged in the upper part of the casing for spraying water upon the material being mixed.

In testimony of which invention I have hereunto set my hand.

WM. B. CAVIN.

Witnesses:
R. M. HUNTER,
J. W. KENWORTHY.